United States Patent
Batchelder

(10) Patent No.: US 8,287,959 B2
(45) Date of Patent: Oct. 16, 2012

(54) SYRINGE TIP ASSEMBLY AND LAYERED DEPOSITION SYSTEMS UTILIZING THE SAME

(75) Inventor: J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 416 days.

(21) Appl. No.: 12/595,870

(22) PCT Filed: Apr. 4, 2008

(86) PCT No.: PCT/US2008/004363
§ 371 (c)(1), (2), (4) Date: Oct. 14, 2009

(87) PCT Pub. No.: WO2008/130489
PCT Pub. Date: Oct. 30, 2008

(65) Prior Publication Data
US 2010/0166969 A1      Jul. 1, 2010

Related U.S. Application Data

(60) Provisional application No. 60/925,338, filed on Apr. 19, 2007.

(51) Int. Cl.
*B05D 5/00*     (2006.01)
*B67D 7/58*     (2010.01)
*B05B 11/00*    (2006.01)

(52) U.S. Cl. ............... 427/256; 222/372; 222/383.3; 222/384

(58) Field of Classification Search .............. None
See application file for complete search history.

(56) References Cited

U.S. PATENT DOCUMENTS

| | | | |
|---|---|---|---|
| 4,472,141 A * | 9/1984 | Dragan | ............ 433/90 |
| 4,639,155 A | 1/1987 | Schuster et al. | |
| 5,121,329 A | 6/1992 | Crump | |
| 5,303,141 A | 4/1994 | Batchelder et al. | |
| 5,340,433 A | 8/1994 | Crump | |
| 5,503,785 A | 4/1996 | Crump et al. | |
| 5,764,521 A | 6/1998 | Batchelder et al. | |
| 5,939,008 A | 8/1999 | Comb et al. | |
| 6,004,124 A | 12/1999 | Swanson et al. | |
| 6,022,207 A | 2/2000 | Dahlin et al. | |
| 6,030,199 A | 2/2000 | Tseng | |
| 6,054,077 A | 4/2000 | Comb et al. | |
| 6,067,480 A | 5/2000 | Stuffle et al. | |
| 6,085,957 A | 7/2000 | Zinniel et al. | |
| 6,238,613 B1 | 5/2001 | Batchelder et al. | |
| 6,328,715 B1 * | 12/2001 | Dragan et al. | ............ 604/232 |
| 6,547,995 B1 | 4/2003 | Comb | |
| 6,685,866 B2 | 2/2004 | Swanson et al. | |
| 6,749,414 B1 | 6/2004 | Hanson et al. | |
| 6,814,907 B1 | 11/2004 | Comb | |
| 6,869,419 B2 | 3/2005 | Dragan et al. | |
| 6,998,087 B1 | 2/2006 | Hanson et al. | |

OTHER PUBLICATIONS

International Search Report of Counterpart Application No. PCT/US2008/004363 Filed on Apr. 4, 2008.

* cited by examiner

*Primary Examiner* — Michael Cleveland
*Assistant Examiner* — James M Mellott
(74) *Attorney, Agent, or Firm* — Brian R. Morrison; Westman, Champlin & Kelly, P.A.

(57) ABSTRACT

A syringe tip assembly comprising a seal component configured to engage a syringe tip, a nozzle configured to slidably engage with the seal component, and a biasing member configured to apply a biasing pressure between the seal component and the nozzle.

15 Claims, 2 Drawing Sheets

SYRINGE TIP ASSEMBLY AND LAYERED DEPOSITION SYSTEMS UTILIZING THE SAME

CROSS-REFERENCE TO RELATED APPLICATION(S)

This application is the national phase of International Patent Application No. PCT/US2008/004363, filed on Apr. 4, 2008, and entitled "Syringe Tip Assembly And Layered Deposition Systems Utilizing The Same"; which claims priority to U.S. Provisional Patent Application No. 60/925,338, filed on Apr. 19, 2007, and entitled "Syringe Tip Assembly And Layered Deposition Systems Utilizing The Same"; the disclosures of which are incorporated by reference in their entireties.

BACKGROUND

The present invention relates to the fabrication of three-dimensional (3D) objects using layered deposition systems. In particular, the present invention relates to syringe tip assemblies for use with syringe-based, layered deposition systems.

A layered deposition system is used to build a 3D object from a computer-aided design (CAD) model in a layer-by-layer manner by depositing a flowable build material. The build material is deposited from a deposition head as a sequence of roads on a substrate in an x-y plane. The deposited build material fuses to previously deposited build material and solidifies. The position of the deposition head relative to the base is then incremented along a z-axis (perpendicular to the x-y plane), and the process is then repeated to form a 3D object resembling the CAD model. Movement of the deposition head with respect to the base is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

One type of deposition head for use with layered deposition systems is a syringe deposition tool. The syringe deposition tool extrudes build material through a syringe tip with the use of a motor-powered syringe piston. However, syringe deposition tools typically have poor flow control, which result in low-quality seams, and are difficult control over the start and stop times due to relatively slow response times. As such, there is a need for a system and method for improving the flow control of syringe deposition tools.

SUMMARY

The present invention relates to a syringe tip assembly for use with an extrusion syringe of a layered deposition system. The syringe tip assembly includes a seal component configured to engage a syringe tip of the extrusion syringe, a nozzle configured to slidably engage with the seal component, and a biasing member configured to apply a biasing pressure between the seal component and the nozzle.

DETAILED DESCRIPTION

Figure 1:
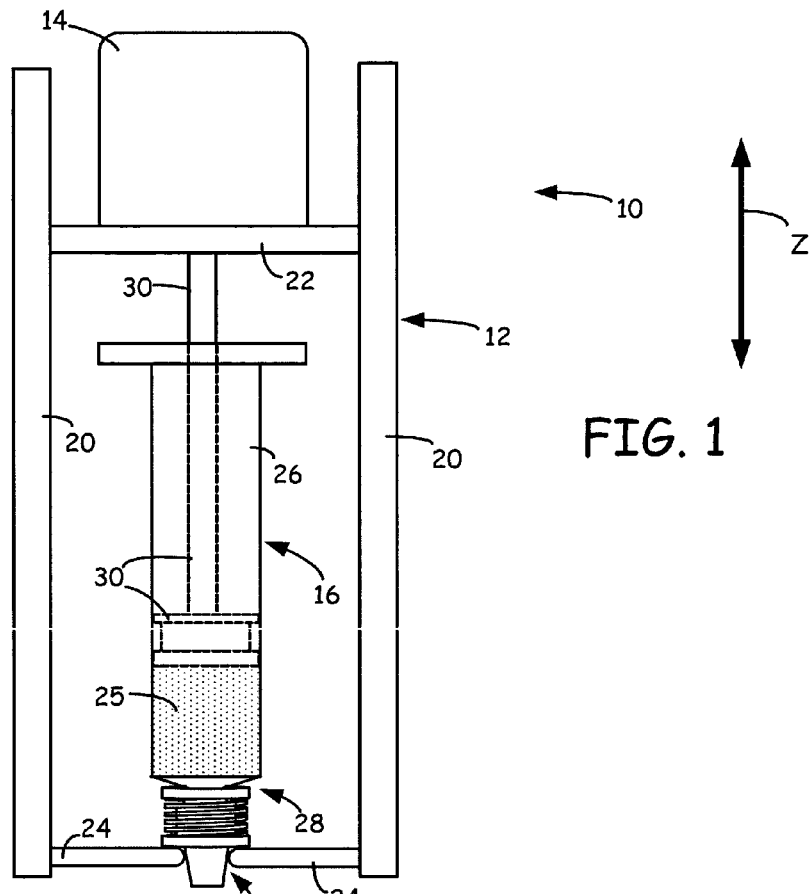
FIG. 1 is a schematic illustration of a syringe deposition tool of a layered deposition system, where the syringe deposition tool includes a syringe tip assembly.

FIG. 1 is a schematic illustration of syringe deposition tool 10, which is a suitable deposition head for use in a layered deposition system (not shown). Examples of suitable layered deposition systems include systems disclosed in Tseng, U.S. Pat. No. 6,030,199 and Stuffle et al., U.S. Pat. No. 6,067,480. Syringe deposition tool 10 includes frame 12, motor 14, syringe 16, and syringe tip assembly 18, where syringe tip assembly 18 is configured to improve flow control when extruding materials during a build operation. Frame 12 includes lateral walls 20, motor support wall 22, and base wall 24, where motor support wall 22 and base wall 24 are offset from each other via lateral walls 20. Frame 12 is secured to one or more gantries (not shown) of the layered deposition system, which allow syringe deposition tool 10 to move around within a build chamber (not shown) of the layered deposition system under computer control.

Motor 14 is a motor (e.g., a linear stepper motor) secured to motor support wall 22, and provides mechanical power to deposit build material 25 from syringe 16 during a build operation. Syringe 16 is an extrusion syringe that includes syringe body 26, syringe tip 28, and piston 30, where syringe tip 28 is the extrusion orifice at the bottom end of syringe body 26. Piston 30 is a syringe piston that is configured to move within syringe body 26 along axis Z for extruding build material 25 through syringe tip 28. Piston 30 is secured to motor 14, thereby allowing motor 14 to control the position of piston 30 within syringe body 26, along axis Z. Syringe 16 may be any type of syringe-based dispenser, such as a disposable plastic syringe.

Syringe tip assembly 18 is an assembly disposed around syringe tip 28 for improving the flow control of syringe deposition tool 10, thereby increasing the quality of the 3D object being built. Syringe tip assembly 18 is positioned against base wall 24 such that a portion of syringe tip assembly 18 extends through opening 32 within base wall 24. As such, when installed in frame 12, syringe 16 and syringe tip assembly 18 are effectively secured between motor support wall 22 and base wall 24. As discussed below, this arrangement allows syringe tip assembly 18 to function as a second piston or compressible volume, thereby improving the flow control of syringe deposition tool 10.

Figure 2:
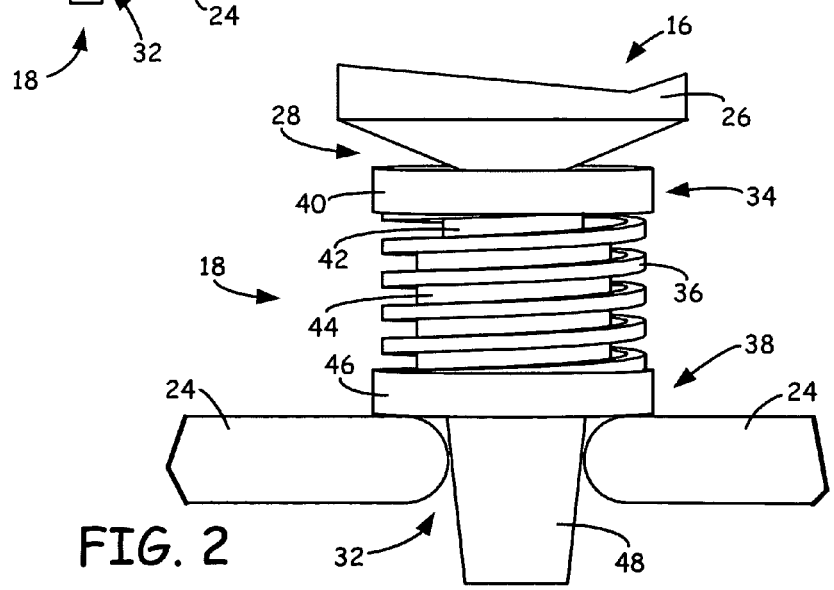
FIG. 2 is an expanded view of the syringe tip assembly, which illustrates the operation of the syringe tip assembly with an extrusion syringe.

FIG. 2 is an expanded view of syringe tip assembly 18 in use with syringe 16 and base wall 24. As shown, syringe tip assembly 18 includes seal component 34, spring 36, and nozzle 38. Seal component 34 is an annular component that extends around syringe tip 28, which desirably provides a seal around syringe tip 28. Seal component 34 may be formed from a variety of materials, such as metals, plastics, and rubbers, and includes ring portion 40 and shaft portion 42, which desirably provide a seal fit with syringe tip 28. When syringe tip assembly 18 is assembled on syringe 16, shaft portion 42 extends within nozzle 38, and ring portion 40 provides a first bearing surface for spring 36. In one embodiment, seal component 34 is secured to syringe tip 28 (e.g., via mechanical and/or adhesive means), which reduces the risk of seal component 34 becoming removed from syringe tip 28. In an alternative embodiment, seal component 34 is integrally formed in syringe tip 28.

Nozzle 38 extends around shaft portion 42 of seal component 34, and is the portion of syringe tip assembly 18 that engages base wall 24 adjacent opening 32. Nozzle 38 includes shaft portion 44, ring portion 46, and tip portion 48. Shaft portion 44, ring portion 46, and tip portion 48 are desirably secured together such that ring portion 46 extends between shaft portion 44 and tip portion 48. Shaft portion 44 is the portion of nozzle 38 that extends around shaft portion 42 of seal component 34, thereby providing a sliding seal fit. Ring portion 46 correspondingly provides a second bearing surface for spring 36, opposite of ring portion 40 of seal component 34, and also desirably provides a surface for supporting nozzle 38 on base wall 24. Tip portion 48 is the portion of nozzle 38 that extends through opening 32, and is the portion through which build material 25 (shown in FIG. 1) extrudes during a build operation.

In one embodiment, nozzle 38 is unsecured from seal component 34, thereby allowing nozzle 38 to move relative to seal component 34. Shaft portion 44 of nozzle 38 desirably forms a sliding seal fit with shaft portion 40 of seal component 34 to reduce the risk of leakage while nozzle 38 moves relative to seal component 34. A capture mechanism (not shown) may also be used to prevent seal component 34 and nozzle 38 from separating. In an alternative embodiment, seal component 34 and nozzle 38 are designed such that shaft portion 44 of nozzle 38 extends within shaft portion 40 of seal component 34 (rather than around shaft portion 40 of seal component 34, as shown in FIG. 2).

Spring 36 is a biasing member disposed between ring portion 40 of seal component 34 and ring portion 46 of nozzle 38, which applies a biasing pressure to separate seal component 34 and nozzle 38 along axis Z. Spring 36 may be secured to seal component 34 and/or to nozzle 38. Alternatively, spring 36 may remain unsecured to seal component 34 and nozzle 38. In additional alternative embodiments, different types of biasing members may be used in lieu of spring 36. For example, spring 36 may be replaced with one or more accordion bellows that apply a biasing pressure to separate seal component 34 and nozzle 38 in a similar manner to spring 36. Furthermore, spring 36 may have a non-linear spring constant, thereby altering the compression of spring 36.

Figure 3:
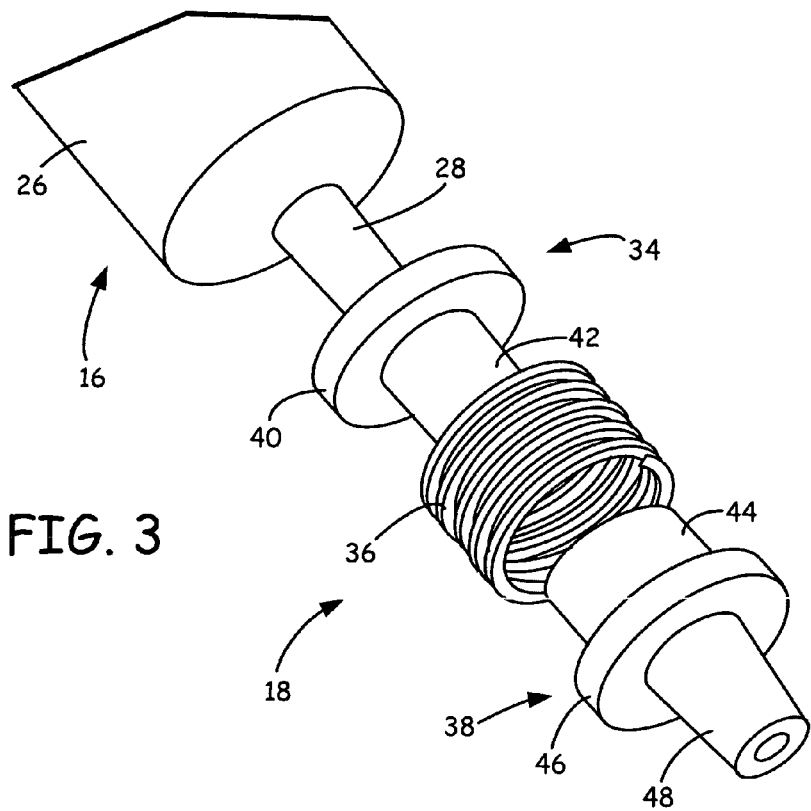
FIG. 3 is an exploded front perspective view of the syringe tip assembly in use with the extrusion syringe.
Figure 4:
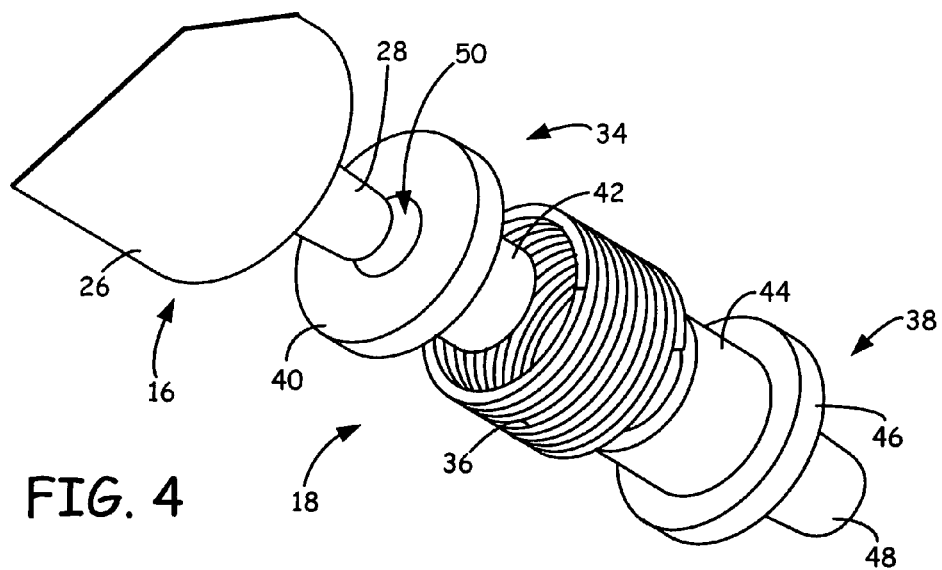
FIG. 4 is an exploded rear perspective view of the syringe tip assembly in use with the extrusion syringe.

FIGS. 3 and 4 are respectively exploded front and rear perspective views of syringe tip assembly 18 in use with syringe 16, further illustrating the engagements between seal component 34, spring 36, and nozzle 38. As shown in FIG. 3, spring 36 is configured to extend around shaft portion 42 of seal component 34, and to engage with ring portion 40 of seal component 34. Shaft portion 44 of nozzle 38 may then be inserted through spring 36 and around shaft portion 42 of seal component 34, thereby retaining spring 36 between ring portions 40 and 46. As shown in FIG. 4, the syringe tip assembly 18 may be inserted onto syringe tip 28 of syringe 16 by inserting syringe tip 28 through the inner opening of seal segment 34 (referred to as opening 50), thereby providing a seal around syringe tip 28.

When initiating a build operation, syringe body 26 of syringe 16 is filled with build material 25 (shown in FIG. 1), or may be provided pre-filled with build material 25. Prior to inserting syringe 16 into frame 12 (shown in FIG. 1), seal component 34 is inserted onto syringe tip 28, as discussed above. Spring 36 is then inserted onto seal component 34, and nozzle 38 is inserted through spring 36 and onto seal component 34. Syringe 16 is then inserted into frame 12 such that piston 30 (shown in FIG. 1) is connected to motor 14 (shown in FIG. 1), and such that tip portion 48 of nozzle 38 extends through opening 32 in base wall 24 (shown in FIGS. 1 and 2). The arrangement of frame 12, motor 14, and syringe 16 desirably allows syringe 16 to be installed into frame 12 such that the compression of spring 36 is minimized. Accordingly, spring 36 desirably exerts a biasing pressure that is sufficient to substantially withstand the weight of syringe 16 and build material 25 without compressing.

During the build operation, syringe deposition tool 10 moves around the build chamber (not shown) of the layered deposition system (not shown). When motor 14 receives a signal to begin depositing build material 25, motor 14 applies a downward force onto piston 30 along axis Z. However, piston 30 does not initially compress into syringe body 26 to extrude build material 25. Instead, syringe 16 and seal component 34 compress spring 36. This occurs, at least in part, because spring 36, in its relaxed or expanded state, requires less force to achieve a small increment of motion along axis Z compared to the friction and compressive resistance to advancing piston 30 into syringe body 26 along axis Z. Therefore, it is easier to compress spring 36 between ring portions 40 and 46 than it is to force piston 30 through syringe body 26, particularly when syringe body 26 contains build material 25. Spring 36 is compressed until seal component 34 reaches and engages with nozzle 38 (i.e., when shaft portion 44 of nozzle 38 contacts ring portion 40 of seal component 34), or until a steady state point is reached between the biasing pressure of spring 36 and the pressure applied by motor 14. At this point, the downward pressure applied by motor 14 forces piston 30 into syringe body 26 to extrude build material 25 through syringe tip 28 and nozzle 38.

In one embodiment, the build data used to build the 3D object is modified to account for a small delay when starting a deposition, due to the compression of spring 36. The delay may be based on a variety of factors, such as the spring constant of spring 36, the pressure applied by motor 14, the material used for build material 25, and frictional resistances between syringe body 26 and piston 30. The modification of the build data allows the deposition of build material 25 to occur at a desired location to reduce the risk of errors in the deposition paths.

Motor 14 may continue to press piston 30 into syringe body 26 to deposit build material 25 until a command to stop the deposition occurs. When stopping the deposition, motor 14 reverses the pressure applied to piston 30, thereby causing piston 30 to pull upward along axis Z. The upward motion of piston 30 correspondingly causes syringe 16 to pull upward along axis Z, thereby removing the downward pressure applied to spring 36. As such, spring 36 causes nozzle 38 to separate from seal component 32, which causes shaft portion 42 of seal component 34 to slide back within shaft portion 44 of nozzle 38, thereby forming a volume within shaft portion 44. The formation of the volume creates a negative pressure that draws the portion of build material 25 in tip portion 48 back into the volume of shaft portion 44. This reduces the risk of drainage/leakage of build material 25 when the deposition is stopped. Accordingly, the use of syringe tip assembly 18 allows the deposition of build material 25 to be quickly stopped, thereby increasing the response rate of syringe deposition tool 10. This is in contrast to standard syringe-based deposition heads, which typically exhibit build material drainage after the command to stop the deposition occurs. Thus, syringe deposition tool 10 is capable of building 3D objects having good seam control, thereby increasing the quality of the 3D objects.

Syringe tip assembly 18 is also suitable for use with standard layered deposition systems without structural modifications to the systems. Syringe tip assembly 18 may inserted onto a syringe (e.g., syringe 16) in the manner discussed above, and the combined syringe/syringe tip assembly 18 are then inserted into a frame (e.g., frame 12, shown in FIG. 1) of the system. As discussed above, nozzle 38 is the load-bearing portion of the combined syringe/syringe tip assembly 18 that is supported by a base wall (e.g., base wall 24, shown in FIGS. 1 and 2). In comparison, when using a standard arrangement (i.e., without the use of syringe tip assembly 18), the syringe tip portion (e.g., syringe tip 28) of the syringe is the load-bearing portion that is supported by the base wall. As such, syringe tip assembly 18 is a simple and inexpensive means for improving flow control of layered deposition systems that incorporate syringe-based deposition heads.

Syringe deposition tool 10 is suitable for use with any type of build and/or support material that are used with syringe-based layered deposition systems. Additionally, build material 25 may include cross-linkable materials, such as thermo-settable materials and photocurable materials. Examples of suitable cross-linkable materials include acrylate-based materials, epoxy-based materials, and combinations thereof. For example, build material 25 may include a two-part curable epoxy material that is mixed and inserted into syringe 16 before syringe 16 is installed into frame 12. Alternatively, a pair of syringe tip assemblies 18 may be used with a dual-syringe arrangement, where each component of a two-part curable epoxy material is extruded into a mixing chamber before depositing (e.g., similar to dental impression syringes).

Although the present invention has been described with reference to preferred embodiments, workers skilled in the art will recognize that changes may be made in form and detail without departing from the spirit and scope of the invention.

The invention claimed is:

1. A method of building a three-dimensional object with a syringe deposition tool of a layered deposition system, wherein the syringe deposition tool includes an extrusion syringe and a syringe tip assembly, the method comprising:
    applying a biasing pressure to separate a syringe body of the extrusion syringe and a nozzle of the syringe tip assembly with a biasing member of the syringe tip assembly that is disposed between the syringe body and the nozzle;
    applying pressure to a piston of the extrusion syringe;
    compressing the biasing member due to the pressure applied to the piston;
    moving the piston through the syringe body after at least partially compressing the biasing member, wherein moving the piston through the syringe body extrudes a material through a syringe tip of the extrusion syringe and through the nozzle; and
    removing at least a portion of the pressure applied to the piston such that the applied biasing pressure is greater than the pressure applied to the piston, which at least partially decompresses the biasing member to form a volume within the syringe tip assembly to retain at least a portion of the material
    further comprising:
        positioning a seal component of the syringe tip assembly around at least the portion of the syringe tip of the extrusion syringe;
        positioning the biasing member against the seal component; and
        positioning the nozzle of the syringe tip assembly against the biasing member, thereby retaining the biasing member between the seal component and the nozzle.

2. The method of claim 1, wherein the biasing member comprises a spring.

3. The method of claim 1, wherein positioning the seal component around at least the portion of the syringe tip comprises forming a seal between the seal component and the syringe tip.

4. The method of claim 1, further comprising forming a sliding engagement between the seal component and the nozzle.

5. The method of claim 1, wherein applying pressure to the piston of the extrusion syringe comprises operating a motor operably secured to the piston.

6. The method of claim 5, and further comprising:
    providing build data for building the three-dimensional object with the layered deposition system; and
    modifying the build data to account for compression of the biasing member.

7. The method of claim 1, wherein the biasing member is also disposed at least partially between a syringe tip of the extrusion syringe and the nozzle.

8. The method of claim 7, wherein the syringe tip assembly further comprises a shaft portion disposed at least partially within the biasing member, the shaft portion having a first end and a second end, the second end being operably engaged with the nozzle, and wherein the method further comprises inserting the syringe tip at least partially within the shaft portion at the first end of the shaft portion.

9. A method of building a three-dimensional object with a syringe deposition tool of a layered deposition system, wherein the syringe deposition tool includes an extrusion syringe and a syringe tip assembly, the method comprising:
    inserting the syringe tip assembly onto the extrusion syringe such that a biasing member of the syringe tip assembly is disposed between a syringe body of the extrusion syringe and a nozzle of the syringe tip assembly;
    loading the syringe tip assembly and the extrusion syringe onto a frame of the layered deposition system such that the nozzle is a load-bearing portion of the syringe tip assembly and the extrusion syringe that is supported by the frame, wherein the biasing member applies a biasing pressure to separate the syringe body and the nozzle;
    applying pressure to a piston of the extrusion syringe to compress the biasing member and to extrude a material from the syringe body; and
    at least partially withdrawing the piston to at least partially decompress the biasing member, thereby forming a volume within the syringe tip assembly to retain at least a portion of the material
    wherein inserting the syringe tip assembly onto the extrusion syringe comprises:
        positioning a seal component of the syringe tip assembly around at least the portion of the syringe tip of the extrusion syringe;
        positioning the biasing member against the seal component; and
        positioning the nozzle of the syringe tip assembly against the biasing member, thereby retaining the biasing member between the seal component and the nozzle.

10. The method of claim 9, wherein the biasing member comprises a spring.

11. The method of claim 9, wherein positioning the seal component around at least the portion of the syringe tip comprises forming a seal between the seal component and the syringe tip.

12. The method of claim 9, further comprising forming a sliding engagement between the seal component and the nozzle.

13. The method of claim 9, and further comprising operably connecting the piston to a motor of the layered deposition system.

14. The method of claim 13, wherein applying pressure to the piston comprises operating the motor.

15. The method of claim 13, and further comprising:
provide build data for building the three-dimensional object with the layered deposition system; and
modifying the build data to account for compression of the biasing member.

* * * * *